(12) United States Patent
Walsh et al.

(10) Patent No.: US 9,158,786 B1
(45) Date of Patent: Oct. 13, 2015

(54) DATABASE SELECTION SYSTEM AND METHOD TO AUTOMATICALLY ADJUST A DATABASE SCHEMA BASED ON AN INPUT DATA

(71) Applicants: Sean Walsh, Redwood City, CA (US); Brian Wheeler, Cherry hills, CO (US); Jeremy Leng, Folsom, CA (US)

(72) Inventors: Sean Walsh, Redwood City, CA (US); Brian Wheeler, Cherry hills, CO (US); Jeremy Leng, Folsom, CA (US)

(73) Assignee: BERTRAM CAPITAL MANAGEMENT, LLC, San Mateo, CA (US)

( * ) Notice: Subject to any disclaimer, the term of this patent is extended or adjusted under 35 U.S.C. 154(b) by 0 days.

(21) Appl. No.: 14/503,415

(22) Filed: Oct. 1, 2014

(51) Int. Cl.
*G06F 17/30* (2006.01)

(52) U.S. Cl.
CPC ............................ *G06F 17/30194* (2013.01)

(58) Field of Classification Search
None
See application file for complete search history.

(56) References Cited

U.S. PATENT DOCUMENTS

| | | | |
|---|---|---|---|
| 4,843,569 A | 6/1989 | Sawada et al. |
| 5,091,852 A | 2/1992 | Tsuchida et al. |
| 5,446,881 A | 8/1995 | Mammel, Jr. |
| 5,701,453 A | 12/1997 | Maloney et al. |
| 5,717,924 A | 2/1998 | Kawai |
| 5,806,059 A | 9/1998 | Tsuchida et al. |
| 5,926,636 A | 7/1999 | Lam et al. |
| 6,012,053 A | 1/2000 | Pant et al. |
| 6,119,130 A | 9/2000 | Nguyen et al. |
| 6,199,195 B1 | 3/2001 | Goodwin |
| 6,324,693 B1 | 11/2001 | Brodersen et al. |
| 6,535,868 B1 | 3/2003 | Galeazzi et al. |
| 6,556,988 B2 | 4/2003 | Tsuchida et al. |
| 6,687,362 B1 | 2/2004 | Lindquist et al. |
| 6,772,180 B1 | 8/2004 | Li et al. |
| 6,834,276 B1 | 12/2004 | Jensen et al. |
| 6,931,419 B1 | 8/2005 | Lindquist et al. |
| 6,954,748 B2 | 10/2005 | Dettinger et al. |
| 6,996,558 B2 | 2/2006 | Dettinger et al. |
| 7,096,229 B2 | 8/2006 | Dettinger et al. |
| 7,174,341 B2 | 2/2007 | Ghukasyan et al. |
| 7,281,013 B2 | 10/2007 | Chaudhuri et al. |
| 7,359,913 B1 | 4/2008 | Ordonez |
| 7,401,085 B2 | 7/2008 | Mackay et al. |
| 7,403,975 B2 | 7/2008 | Berkery et al. |
| 7,526,508 B2 | 4/2009 | Tan et al. |
| 7,673,291 B2 | 3/2010 | Dias et al. |
| 7,836,071 B2 | 11/2010 | Glowacki et al. |
| 7,890,524 B2 | 2/2011 | Dettinger et al. |

(Continued)

FOREIGN PATENT DOCUMENTS

| | | |
|---|---|---|
| CN | 103530538 A | 1/2014 |
| DE | 112012005177 T5 | 8/2014 |

(Continued)

*Primary Examiner* — Hung Q Pham
(74) *Attorney, Agent, or Firm* — Raj Abhyanker, P.C.

(57) ABSTRACT

Disclosed are a database selection system and/or a method to automatically adjust a database schema based on an input data. The method of the database selection system includes identifying an attribute of the input data. An optimal database type is determined in which the input data is to be stored based on a match between the optimal database type and the attribute. The method selects an ideal database based on the optimal database type from a set of distributed heterogeneous databases. The method determines if an existing database schema of the ideal database is optimally structured based on the input data. An ideal database schema is automatically adjusted based on the input data using a processor and a memory.

18 Claims, 8 Drawing Sheets

PROCESS FLOW
750

(56) References Cited

U.S. PATENT DOCUMENTS

| | | |
|---|---|---|
| 7,895,338 B2 | 2/2011 | Leaute et al. |
| 8,078,643 B2 | 12/2011 | Mush et al. |
| 8,195,602 B2 | 6/2012 | Bakalash et al. |
| 8,321,451 B2 | 11/2012 | Dettinger et al. |
| 8,365,138 B2 | 1/2013 | Iborra et al. |
| 8,442,941 B2 | 5/2013 | Yao et al. |
| 8,601,026 B2 | 12/2013 | Kikuchi |
| 8,606,824 B2 | 12/2013 | Cohen et al. |
| 8,768,974 B1 | 7/2014 | Annapragada et al. |
| 8,799,855 B2 | 8/2014 | Carusi et al. |
| 8,819,068 B1 | 8/2014 | Knote et al. |
| 8,825,502 B2 | 9/2014 | Bormann et al. |
| 2002/0169777 A1 | 11/2002 | Balajel et al. |
| 2003/0088554 A1 | 5/2003 | Ryan et al. |
| 2005/0172261 A1 | 8/2005 | Yuknewicz et al. |
| 2005/0198059 A1 | 9/2005 | Chou |
| 2011/0238705 A1 | 9/2011 | Baker et al. |
| 2012/0036146 A1* | 2/2012 | Annapragada ................ 707/764 |
| 2012/0303555 A1 | 11/2012 | Yakout et al. |
| 2013/0046799 A1 | 2/2013 | Hale et al. |
| 2014/0067791 A1 | 3/2014 | Idicula et al. |
| 2014/0181151 A1 | 6/2014 | Mazoue |
| 2014/0258344 A1 | 9/2014 | Felke et al. |

FOREIGN PATENT DOCUMENTS

| | | |
|---|---|---|
| EP | 1367503 A1 | 12/2003 |
| WO | 2014130733 A1 | 8/2014 |

* cited by examiner

EXPLODED VIEW OF DYNAMIC
ANALYSIS ALGORITHM
450

DATABASE SELECTION SYSTEM AND METHOD TO AUTOMATICALLY ADJUST A DATABASE SCHEMA BASED ON AN INPUT DATA

FIELD OF THE TECHNOLOGY

This disclosure relates generally to the database management system, and more particularly, to a database selection system and a method to automatically adjust a database schema based on an input data.

BACKGROUND

A database may be an organized collection of data. The database may be organized to model aspects of reality in a way that supports processes requiring this information. For example, organization of the database may include a modeling of goods in a warehouse in a way that supports finding a particular item in a particular category.

A database management system may be a software application that interacts with a user, other applications, and/or the database itself to capture and analyze data. For example, the database management system may be a software system designed to allow the definition, creation, querying, update, and/or administration of databases. Unfortunately, the database is not generally portable across different database management systems.

SUMMARY

Disclosed are a database selection system and/or a method to automatically adjust a database schema based on an input data.

In one aspect, a method of a database selection system includes identifying an attribute of an input data. An optimal database type is determined in which the input data is to be stored based on a match between the optimal database type and the attribute. The method selects an ideal database based on the optimal database type from a set of distributed heterogeneous databases. The method determines if an existing database schema of the ideal database is optimally structured based on the input data. An ideal database schema is automatically adjusted based on the input data using a processor and a memory.

The method may determine a storage requirement based on the input data. An elastic storage system may be automatically partitioned based on the storage requirement. The method may associate a partitioned elastic storage system with the ideal database. Further, the method may dynamically scale a storage size of the elastic storage system based on an additional input data.

The ideal database may be a non-relational database, an unstructured database and/or a relational database. A uniform query language may be applied that initially defines a data structure in a relational manner. The data structure may be optionally checked by the database selection system. Further, the database selection system may be a part of a database management system. The uniform query language may be an omnibase query language. In addition, the ideal database may be a non-relational database that permits a database to store and/or access unstructured data in a manner that optimizes a set of key-value stores to improve performance of the database in an absence of table relationships.

The method may include receiving a workload data from a database server of the database selection system. The method may further include applying a dynamic analysis algorithm to assess a query complexity, assess a query frequency, measure a server workload for a processor intensiveness and/or a server intensiveness, detect a common query geography, a server down-time, a geographic proximity of a workload request, and/or detect a temporal query load pattern. In addition, the method may re-distribute a logical schema to a database architecture over one instance of the database server based on an output of the dynamic analysis algorithm. The database architecture may conform to a service level. The database architecture may include a first database format and/or a second database format.

Further, the method may process the logical schema from a developer that includes an abstraction table defined by a meta command of a conceptual command domain. The abstraction table may include a set of rows which further includes records and/or a set of columns which includes attributes. The abstraction table may have a set of data values at a set of fields occurring at a set of intersections of each row and/or each column.

The method may analyze a set of the meta commands defining the abstraction table to determine a first sub-domain of the conceptual command domain associated with the first database format and/or a second sub-domain of the conceptual command domain associated with the second database format. The method may further include constraining a transitional freedom of a format in which the logical schema and/or a portion of the logical schema may be expressed. The transitional freedom may be constrained to the first database format and/or the second database format. A static analysis algorithm may be applied to measure an extent of normalization of the logical schema, detect within the set of data values a data signature indicative of efficiency within a particular database format and/or detect a server-side subroutine indicative of efficiency and/or operability in the first database format and/or the second database format.

The method may determine the service level associated with a user that includes a vertical scalability and/or a horizontal scalability. The method may distribute the logical schema to the database architecture over one or more instances of the database server based on the output of a static analysis module. In addition, the database architecture may conform to the service level. The database architecture may include the first database format and/or the second database format.

In another aspect, a method of a database selection system includes identifying an attribute of an input data. The method determines an optimal database type in which the input data is to be stored based on a match between the optimal database type and the attribute. Further, the method selects an ideal database based on the optimal database type from a set of distributed heterogeneous databases. The method determines if an existing database schema of the ideal database is optimally structured based on the input data. The method automatically adjusts the ideal database schema based on the input data using a processor and a memory. A storage requirement is determined based on the input data. The method includes automatically partitioning an elastic storage system based on the storage requirement. Further, the method associates a partitioned elastic storage system with the ideal database. The method dynamically scales a storage size of the elastic storage system based on an additional input data.

In yet another aspect, a database selection system includes a computer server of a machine learning environment. The computer server further includes one or more computers having instructions stored thereon that when executed cause the one or more computers to identify an attribute of an input data. An optimal database type is determined in which the input data is to be stored based on a match between the optimal database type and the attribute. Further, an ideal database is selected based on the optimal database type from a set of distributed heterogeneous databases. The method determines if an existing database schema of the ideal database is optimally structured based on the input data. The method also includes automatically adjusting the ideal database schema based on the input data using a processor and a memory.

The methods and systems disclosed herein may be implemented in any means for achieving various aspects, and may be executed in a form of a machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE FIGURES

Example embodiments are illustrated by way of example and are not limited in the figures of the accompanying drawings, in which like references indicate similar elements and in which.

Figure 1:
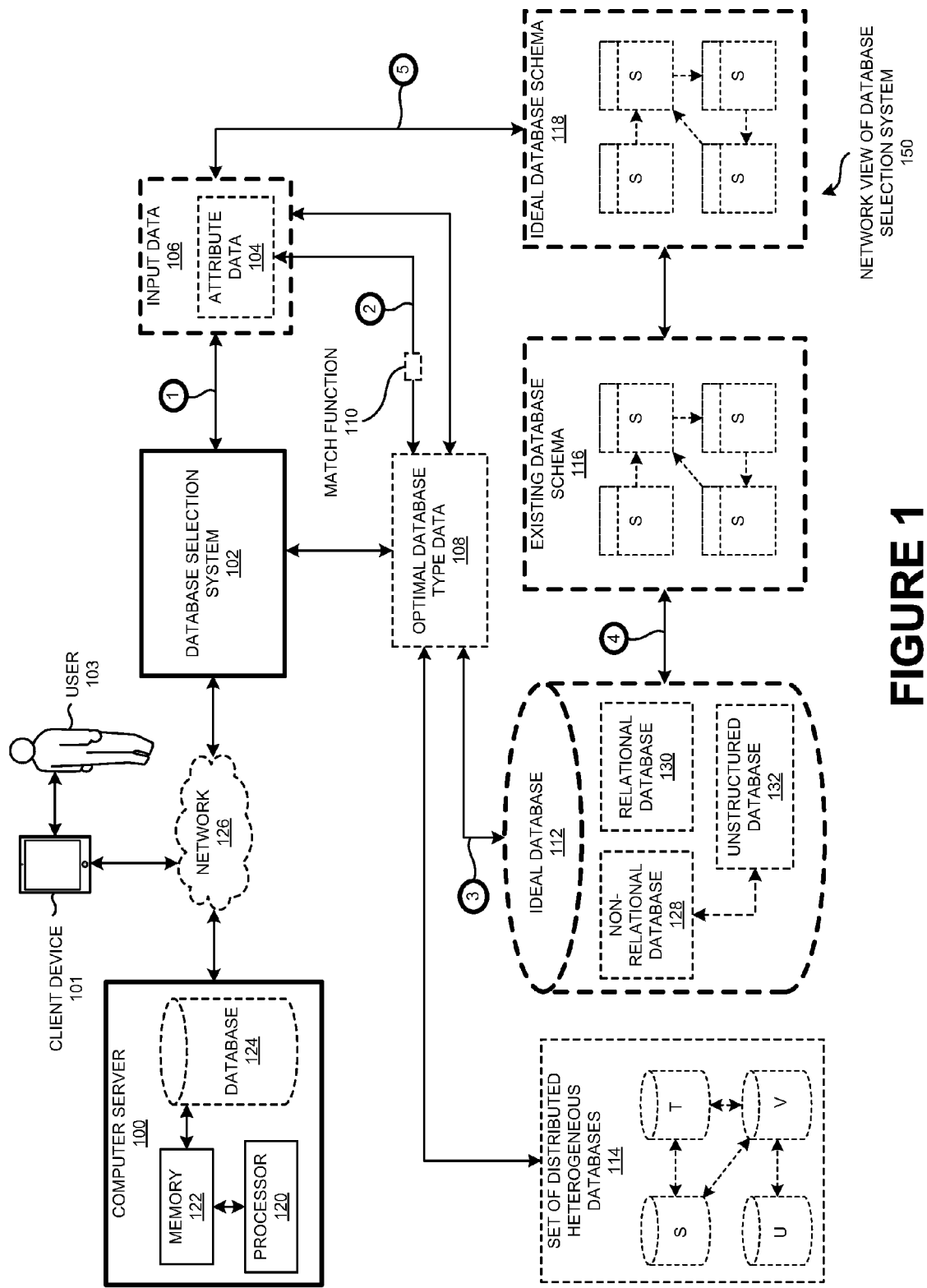
FIG. 1 is a network view of a database selection system communicating with a computer server through a network, according to one embodiment.

Other features of the present embodiments will be apparent from the accompanying drawings and from the detailed description that follows.

DETAILED DESCRIPTION

Disclosed are a database selection system and/or a method to automatically adjust a database schema based on an input data.

In one embodiment, a method of a database selection system 102 includes identifying an attribute (e.g., attribute data 104) of an input data 106. An optimal database type (e.g., optimal database type data 108) is determined in which the input data 106 is to be stored based on a match (e.g., using match function 110) between the optimal database type and the attribute (e.g., attribute data 104). The method selects an ideal database 112 based on the optimal database type (e.g., optimal database type data 108) from a set of distributed heterogeneous databases 114. The method determines if an existing database schema 116 of the ideal database 112 is optimally structured based on the input data 106. An ideal database schema 118 is automatically adjusted based on the input data 106 using a processor 120 and a memory 122.

The method may determine a storage requirement (e.g., using storage requirement function 202) based on the input data 106. An elastic storage system 206 may be automatically partitioned based on the storage requirement. The method may associate a partitioned elastic storage system 204 with the ideal database 112. Further, the method may dynamically scale a storage size (e.g., storage size data 208) of the elastic storage system 206 based on an additional input data 210.

The ideal database 112 may be a non-relational database 128, an unstructured database 132 and/or a relational database 130. A uniform query language may be applied that initially defines a data structure 214 in a relational manner. The data structure 214 may be optionally checked by the database selection system 102. Further, the database selection system 102 may be a part of a database management system 216. The uniform query language may be an omnibase query language 212.

In addition, the ideal database 112 may be a non-relational database 128 that permits a database 124 to store and/or access unstructured data 213 in a manner that optimizes a set of key-value stores 215 to improve performance of the database 124 in an absence of table relationships.

The method may include receiving a workload data 302 from a database server 304 of the database selection system 102. The method may further include applying a dynamic analysis algorithm 306 to assess a query complexity 402, assess a query frequency 404, measure a server workload 406 for a processor intensiveness 408 and/or a server intensiveness 410, detect a common query geography 412, a server down-time 414, a geographic proximity 416 of a workload request 418, and/or detect a temporal query load pattern 420. In addition, the method may re-distribute (e.g., using re-distribute function 308) a logical schema 310 to a database architecture 312 over one instance (e.g., instance data 314) of the database server 304 based on an output (e.g., output data 316) of the dynamic analysis algorithm 306. The database architecture 312 may conform to a service level (e.g. service level data 350). The database architecture 312 may include a first database format (e.g., first database format data 318) and/or a second database format (e.g., second database format data 320).

Further, the method may process the logical schema 310 from a developer 322 that includes an abstraction table 324 defined by a meta command 326 of a conceptual command domain 328. The abstraction table 324 may include a set of rows 330 which further includes records (e.g., Record 1, Record 2, etc.) and/or a set of columns 332 which includes attributes (e.g., Attribute 1, Attribute 2, etc.). The abstraction table 324 may have a set of data values 334 at a set of fields 336 occurring at a set of intersections 338 of each row and/or each column. The method may analyze a set of the meta commands 340 defining the abstraction table 324 to determine a first sub-domain 342 of the conceptual command domain 328 associated with the first database format (e.g., first database format data 318) and/or a second sub-domain 344 of the conceptual command domain 328 associated with the second database format (e.g., second database format data 320).

The method may further include constraining a transitional freedom (e.g., using transitional freedom algorithm 346) of a format in which the logical schema 310 and/or a portion of the logical schema 348 may be expressed. The transitional freedom (e.g., using transitional freedom algorithm 346) may be constrained to the first database format (e.g., first database format data 318) and/or the second database format (e.g., second database format data 320).

A static analysis algorithm 500 may be applied to measure an extent of normalization (e.g. normalization data 502) of the logical schema 310, detect within the set of data values 334 a data signature 504 indicative of efficiency within a particular database format (e.g., particular database format data 506) and/or detect a server-side subroutine indicative of efficiency and/or operability in the first database format (e.g., first database format data 318) and/or the second database format (e.g., second database format data 320). The method may determine the service level (e.g., service level data 350) associated with a user 103 that includes a vertical scalability (e.g., vertical scalability data 352) and/or a horizontal scalability (e.g., horizontal scalability data 354). The method may distribute (e.g., using distribute function 356) the logical schema 310 to the database architecture 312 over one or more instances (e.g., instance data 314) of the database server 304 based on the output of a static analysis module 358. In addition, the database architecture 312 may conform to the service level (e.g., service level data 350). The database architecture 312 may include the first database format (e.g., first database format data 318) and/or the second database format (e.g., second database format data 320).

In another embodiment, a method of a database selection system 102 includes identifying an attribute (e.g., attribute data 104) of an input data 106. The method determines an optimal database type in which the input data 106 is to be stored based on a match (e.g., using match function 110) between the optimal database type (e.g., optimal database type data 108) and the attribute (e.g., attribute data 104). Further, the method selects an ideal database 112 based on the optimal database type from a set of distributed heterogeneous databases 114. The method determines if an existing database schema 116 of the ideal database 112 is optimally structured based on the input data 106. The method automatically adjusts the ideal database schema 118 based on the input data 106 using a processor 120 and a memory 122. A storage requirement is determined based on the input data 106. The method includes automatically partitioning an elastic storage system 206 based on the storage requirement. Further, the method associates a partitioned elastic storage system 204 with the ideal database 112. The method dynamically scales a storage size (e.g., storage size data 208) of the elastic storage system 206 based on an additional input data 210.

In yet another embodiment, a database selection system 102 includes a computer server 100 of a machine learning environment. The computer server 100 of the machine learning environment further includes one or more computers having instructions stored thereon that when executed cause the one or more computers to identify an attribute (e.g., attribute data 104) of an input data 106. An optimal database type (e.g., optimal database type data 108) is determined in which the input data 106 is to be stored based on a match (e.g., match function 110) between the optimal database type and the attribute (e.g., attribute data 104). Further, an ideal database 112 is selected based on the optimal database type (e.g., optimal database type data 108) from a set of distributed heterogeneous databases 114. The method determines if an existing database schema 116 of the ideal database 112 is optimally structured based on the input data 106. The method also includes automatically adjusting the ideal database schema 118 based on the input data 106 using a processor 120 and a memory 122.

FIG. 1 is a network view of a database selection system 102 communicating with a computer server 100 through a network 126, according to one embodiment. Particularly, FIG. 1 illustrates a network view of database selection system 150, a computer server 100, a client device 101, a database selection system 102, a user 103, an attribute data 104, an input data 106, an optimal database type data 108, a match function 110, an ideal database 112, a set of distributed heterogeneous databases 114, an existing database schema 116, an ideal database schema 118, a processor 120, a memory 122, a database 124, a network 126, a non-relational database 128, a relational database 130 and an unstructured database 132. The computer server 100 may be a software (e.g., a program, an application) and/or a hardware that provides data to other computers while managing resources and services of the network 126, while handling requests from different computers to access said resources, according to one embodiment.

The client device 101 (e.g., a mobile phone, a tablet, a computer) may be a computing device that accesses a service made available by a computer server 100. The database selection system 102 may be a system that choose dispersive database similar to the characteristics of the target. A user 103 may be an individual with the client device 101, according to one embodiment. The attribute data 104 may be a specification that defines a property and/or characteristics of an object, element and/or file, according to one embodiment.

The input data 106 may be an information given to the computer server 100 either automatically or manually, according to one embodiment. The optimal database type data 108 may define the list of data types that are available for defining columns (e.g., set of columns 332). The match function 110 may be a set of instructions that performs a specific task of comparing two or more sets of collected data (e.g., input data 106). The ideal database 112 may be a model which includes collection of information organized to provide efficient retrieval. A set of distributed heterogeneous databases 114 may be an automated and/or semi-automated system for the integration of heterogeneous, disparate database management systems to present a user 103 with a single, unified query interface, according to one embodiment.

An existing database schema 116 may be a current logical view of entire database 124. The ideal database schema 118 may be a complete logical view of entire database 124. The processor 120 may be a central unit of the computer containing the logic circuitry to perform all the basic instructions of a computer program, according to one embodiment. The memory 122 may be a device used to store data or programs (e.g., sequences of instructions) on a temporary or permanent basis for use in an electronic digital computer. A database 124 may be a collection of information that is organized so that it can easily be accessed, managed, and/or updated, according to one embodiment.

A network 126 may be a group of computing devices (e.g., hardware and software) that are linked together through communication channels (e.g., wired, wireless) to facilitate communication and resource-sharing among a wide range of users. A non-relational database 128 may be a database that does not incorporate the table and/or key model. A relational database 130 may be a collective set of multiple data sets organized by tables, records and/or columns, according to one embodiment. An unstructured database 132 may be a generic label for describing any data that is not in a database, according to one embodiment.

FIG. 1 illustrates a computer server 100 including a database 124 coupled with a memory 122 and a processor 120, according to one embodiment. The computer server 100 may be communicatively coupled with the database selection system 102 through the network 126. The user 103 with a client device 101 may be connected to the computer server 100 through the network 126. The input data 106 including attribute data 104 may be associated with the database selection system 102. The optimal database type data 108 may be coupled with the attribute data 104 of the input data 106 based on the match function 110. The ideal database schema 118 may be associated with the input data 106. The optimal database type data 108 may be coupled to the ideal database 112 and set of distributed heterogeneous databases 114. The existing database schema 116 may be associated to the ideal database 112 and the ideal database schema 118, according to one embodiment.

In circle '1', the attribute data 104 of the input data 106 may be identified by the database selection system 102. In circle '2', the optimal database type (e.g., optimal database type data 108) storing the input data 106 may be determined based on the match (using the match function 110). In circle '3', an ideal database 112 may be selected from the set of distributed heterogeneous databases 114 based on the optimal database type data 108. In circle '4', it may be determined that the existing database schema 116 of the ideal database 112 based on the input data 106 is optimally structured. In circle '5', the ideal database schema 118 may be automatically adjusted based on the input data 106 using the processor 120 and/or the memory 122 of the computer server 100, according to one embodiment.

Figure 2:
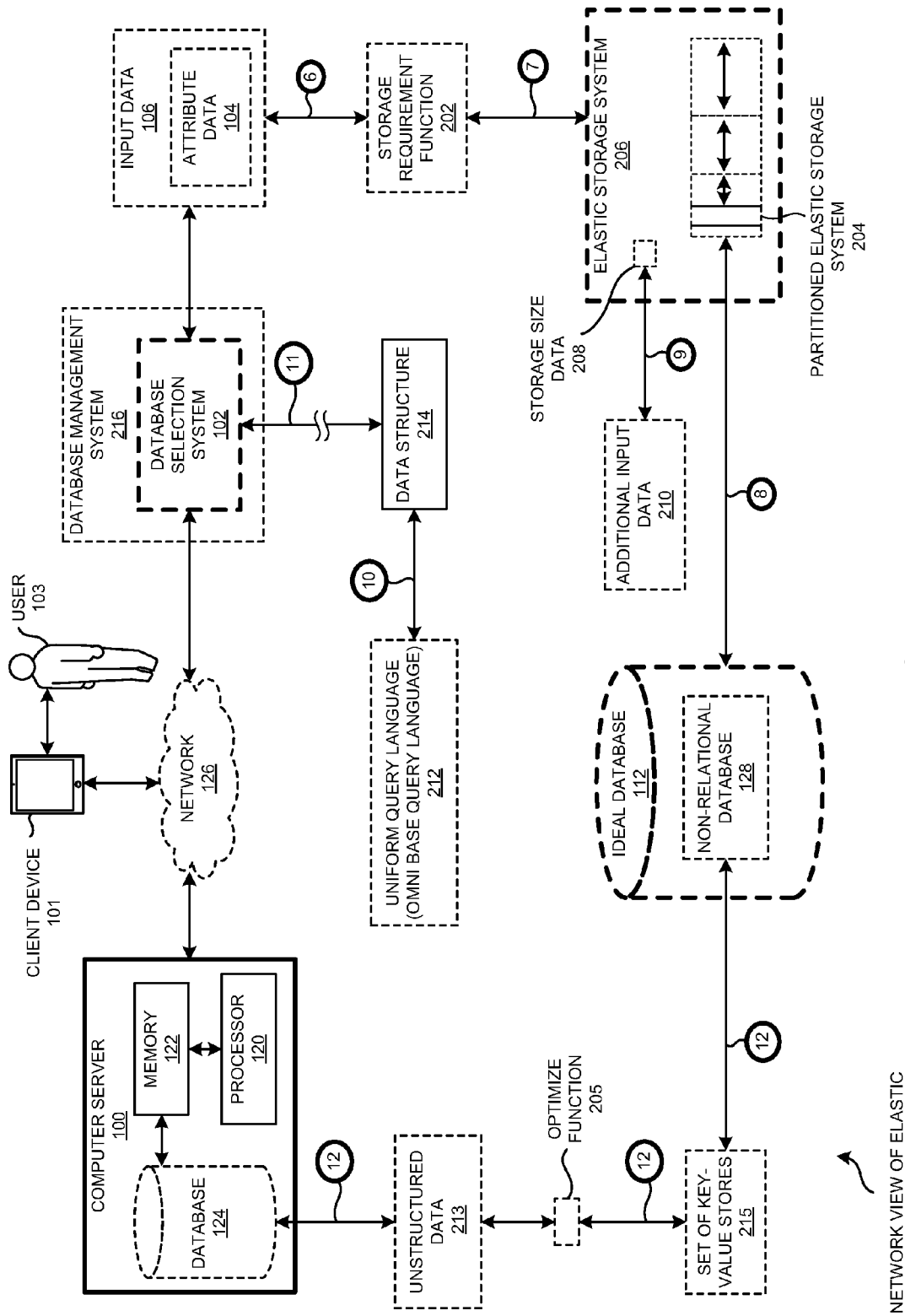
FIG. 2 is a network view of an elastic storage system illustrating a partitioning of the elastic storage system based on a storage requirement, according to one embodiment.

FIG. 2 is a network view of elastic storage system 250 illustrating a partitioning of an elastic storage system 206 based on the storage requirement, according to one embodiment. Particularly, FIG. 2 builds on FIG. 1 that illustrates a storage requirement function 202, a partitioned elastic storage system 204, an optimize function 205, an elastic storage system 206, a storage size data 208, an additional input data 210, an omnibase query language 212, unstructured data 213, a data structure 214, a set of key-value stores 215 and a database management system 216. FIG. 2 differs from FIG. 1 as it may describe automatically partitioning data in an elastic storage system 206 based on a storage requirement.

The storage requirement function 202 may be a set of instructions that determines the storage capacity based on the input data 106 (of FIG. 1), according to one embodiment. The partitioned elastic storage system 204 may be a divided data of an elastic storage system 206. The optimize function 205 may be a set of instructions that performs a specific task of enhancing a set of key-value stores 215. An elastic storage system 206 may be a flexible storage system to accumulate the data (e.g. input data 106), according to one embodiment.

A storage size data 208 may be the data that informs about the capacity of the system to collect the data (e.g. input data 106). The additional input data 210 may be a supplementary data apart from the actual input data 106. An omnibase query language 212 may be a computer language (e.g., a program) which provides a uniform interface to database 124 (of FIG. 1) that stores information about the objects. The unstructured data 213 may be describing any data that is not in a database 124. The data structure 214 may be a collection of data items stored in the memory 122. The set of key-value stores 215 may be a collection of key-value stores that allows the developer 322 (of FIG. 3) to store schema-less data. This data may consist of a string which represents the key and the actual data which is considered to be the value in the "key-value relationship". The database management system 216 may be a software system that uses a standard method of cataloging, retrieving, and running queries on data. The database management system 216 may manage incoming data, organize it, and provides ways for the data to be modified or extracted by the user 103, according to one embodiment.

FIG. 2 illustrates the storage requirement function 202 may be coupled to the input data 106 and the elastic storage system 206. The partitioned elastic storage system 204 of the elastic storage system 206 may be associated with the ideal database 112 (of FIG. 1). The storage size data 208 of the elastic storage system 206 may be associated with the additional input data 210. The unstructured data 213 may be associated with the database 124 of the computer server 100 and the set of key-value stores 215 which is coupled to the non-relational database 128 of the ideal database 112. The data structure 214 may be coupled to the database selection system 102 of the database management system 216. The uniform query language (e.g., omnibase query language 212) may be associated with the data structure 214, according to one embodiment.

In circle '6', the storage requirement (e.g., using a storage requirement function 202) may be determined based on the input data 106. In circle '7', the elastic storage system 206 may be automatically partitioned based on the storage requirement. In circle '8', a partitioned elastic storage system 204 may be associated with the ideal database 112 (of FIG. 1). In circle '9', the storage size (e.g., the storage size data 208) of the elastic storage system 206 may be scaled dynamically based on the additional input data 210. In circle '10', the uniform query language (e.g., omnibase query language 212) may be applied to define the data structure 214. In circle '11', the data structure 214 may be optionally checked by the database selection system 102 of the database management system 216. In circle '12', the non-relational database 128 may allow the database 124 to store and access unstructured data 213 in a way that optimizes (e.g., using optimize function 205) the set of key-value stores 215 to boost the performance of the database 124, according to one embodiment.

Figure 3:
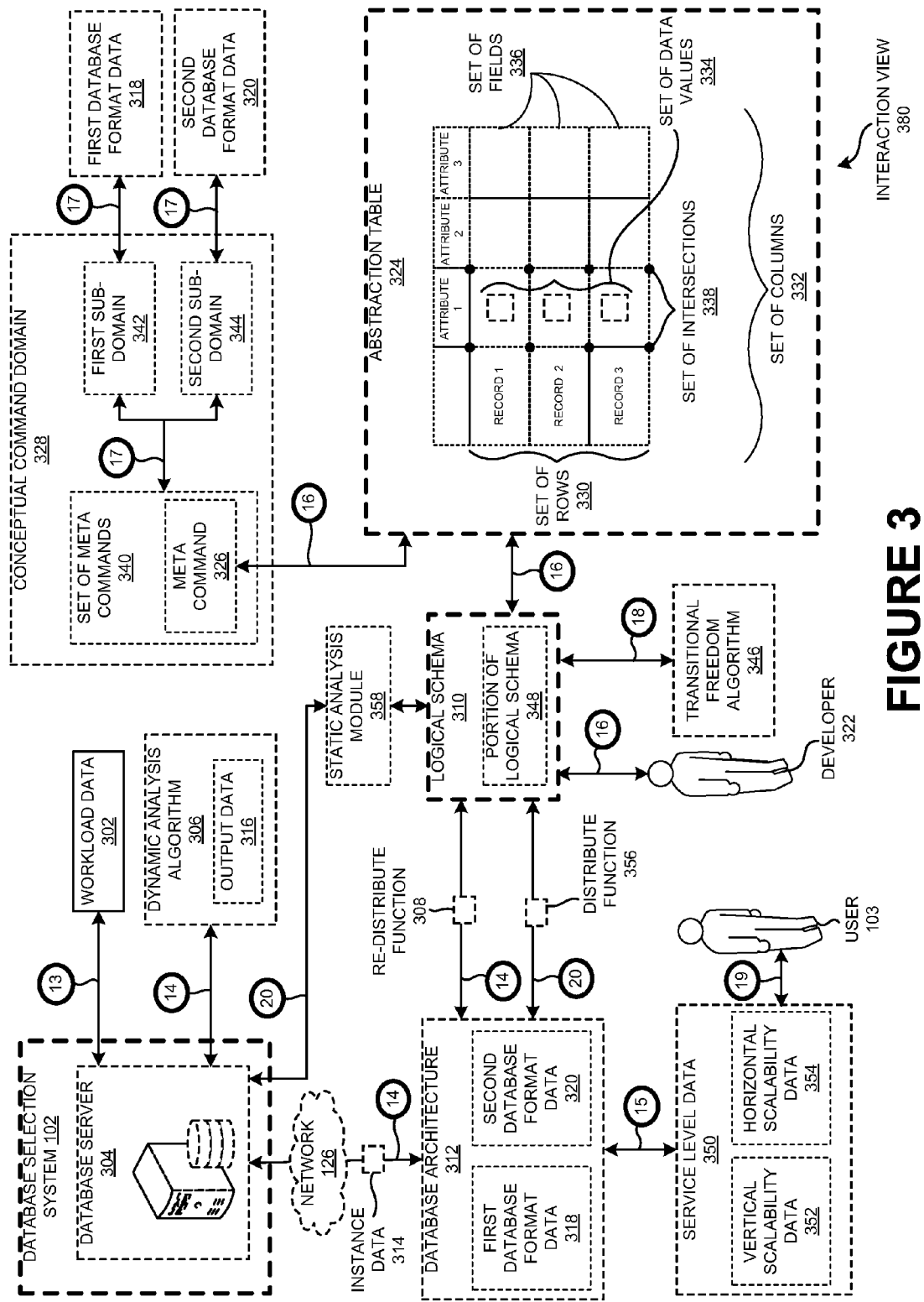
FIG. 3 is an interaction view illustrating re-distribution and distribution of a logical schema to a database structure, according to one embodiment.

FIG. 3 is an interaction view 380 illustrating the distribution and/or the re-distribution of the logical schema 310, according to one embodiment. Particularly, FIG. 3 illustrates a workload data 302, a database server 304, a dynamic analysis algorithm 306, a re-distribute function 308, a logical schema 310, a database architecture 312, an instance data 314, an output data 316, a first database format data 318, a second database format data 320, a developer 322, an abstraction table 324, a meta command 326, a conceptual command domain 328, a set of rows 330, a set of columns 332, a set of data values 334, a set of fields 336, a set of intersections 338, a set of meta commands 340, a first sub-domain 342, a second sub-domain 344, a transitional freedom algorithm 346, a portion of the logical schema 348, a service level data 350, a vertical scalability data 352, a horizontal scalability data 354, a distribute function 356 and a static analysis module 358, according to one embodiment.

The workload data 302 may be the total number of requests made by the user 103 and applications of a system. The database server 304 may be a computer program that provides database services to other computer programs. The dynamic analysis algorithm 306 may be the set of steps applied on the system to relocate the abstraction table 324 based on the characteristics and/or attributes of the abstraction table 324 or feature of the set of fields 336. The dynamic analysis algorithm 306 may be applied to evaluate a query (e.g., query complexity 402 or query frequency 404), measure workload and/or detect a common query geography 412, server downtime 414, geographic proximity 416 and/or temporal query load pattern 420 (of FIG. 4), according to one embodiment.

The re-distribute function 308 may be the set of instructions that perform a specific task of re-allocating some data associated with the data file utilizing the logical schema 310. The logical schema 310 may be a data model of a specific problem domain expressed in terms of a particular data management technology. The database architecture 312 may be a set of specifications, rules, and processes that dictate how data is stored in a database 124 (of FIG. 1) and how data is accessed by components of a system. The instance data 314 may be used to describe a complete database environment including table structure, stored procedures and/or other functionality, according to one embodiment.

Figure 4:
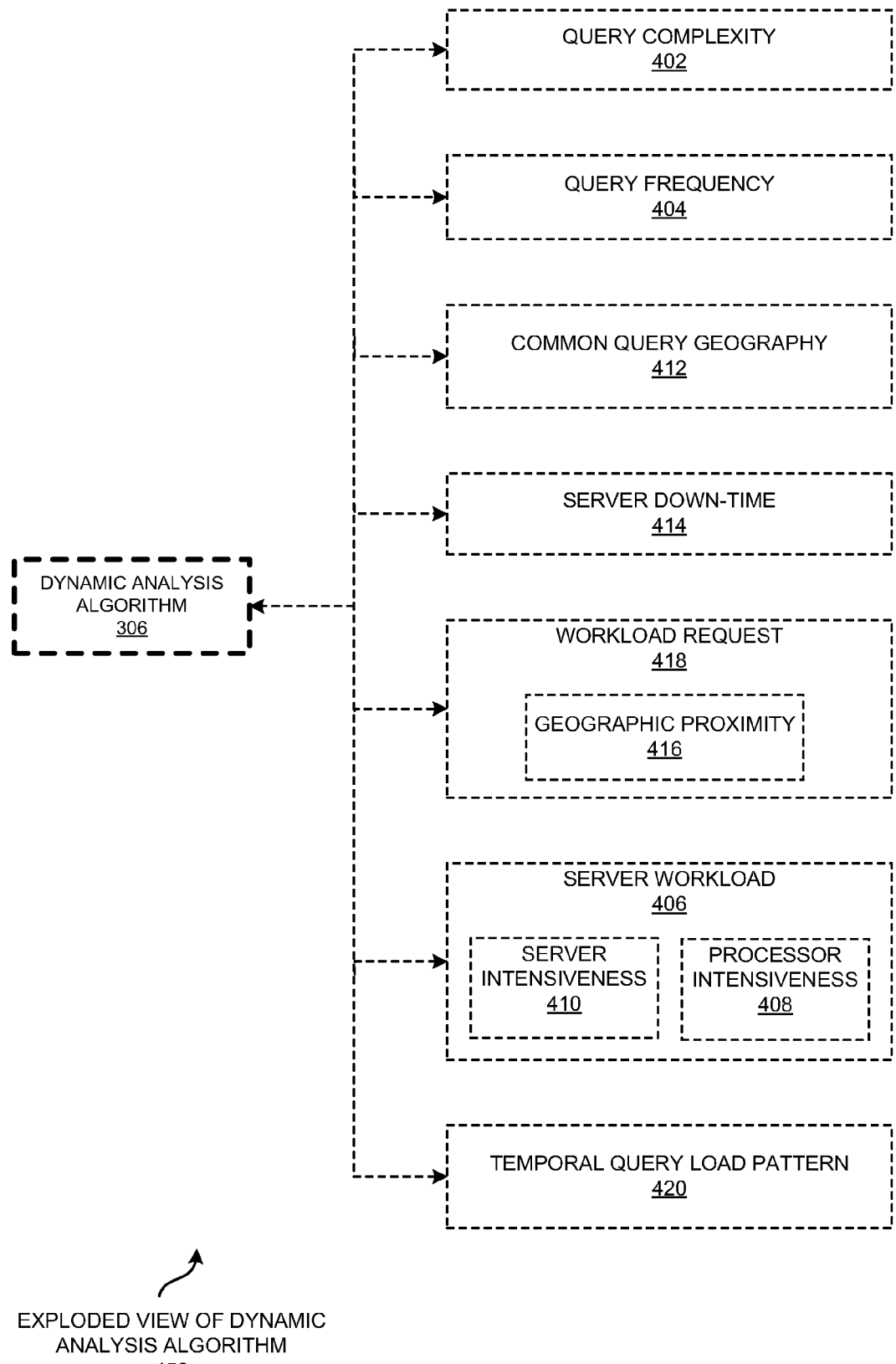
FIG. 4 is an exploded view of a dynamic analysis algorithm of FIG. 3, according to one embodiment.

The output data 316 of the dynamic analysis algorithm 306 may be the data generated by a computer after performing set of steps applied to evaluate the query, measure workload, detect the common query geography 412, the server downtime 414, the geographic proximity 416 of a workload request 418, and/or detect a temporal query load pattern 420 (of FIG. 4). The first database format data 318 may be a first file used to store the data (e.g., input data 106) in series of tables, table fields and/or field data values, according to one embodiment.

The second database format data 320 may be a second file used to store the data (e.g., input data 106) in series of tables, table fields and/or field data values. The developer 322 may be a person or an individual who creates code to access or change data in the data warehouse and interacts with the logical schema 310. The abstraction table 324 may be a set of data elements (e.g., values) using a model of vertical columns (e.g., set of columns 332) and horizontal rows (e.g., set of rows 330). The meta command 326 may be a command which is issued by means of a meta key sequence. The conceptual command domain 328 may refer to the description of an attribute's (e.g., attribute data 104 of the input data 106) allowed values. The set of rows 330 may be a group of horizontal records (e.g., Record 1, Record 2, etc.) that represents structured data and/or unstructured data 213 in the abstraction table 324, according to one embodiment.

The set of columns 332 may be a group of vertical records (e.g., Attribute 1, Attribute 2, etc.) that represents structured data and/or unstructured data 213 in the abstraction table 324. The set of data values 334 may be a collection of data variables set aside by the data entities and all its attributes (e.g., attribute data 104). The set of fields 336 may be a collection of components that provide structure for the abstraction table 324. The set of intersections 338 may be the junction of the set of rows 330 and set of columns 332, according to one embodiment.

The set of meta commands 340 may be the group of commands which are issued by means of a meta key sequence. The first sub-domain 342 may be the first subset of the conceptual command domain 328. The second sub-domain 344 may be the second subset of the conceptual command domain 328, according to one embodiment.

The transitional freedom algorithm 346 may provide a degree of change between states during an operation of the algorithm such that the algorithm permits changes within a threshold area of the logical schema 310. The portion of the logical schema 348 may be a part of a data model of a specific problem domain expressed in terms of a particular data management technology. The service level data 350 may be the data that measures the performance of a system. The vertical scalability data 352 may be the addition of resources to a single system node, such as a single computer or network station to increase the capacity of existing hardware or software. Vertical scalability (e.g., vertical scalability data 352) may provide more shared resources for the operating system and applications, according to one embodiment.

The horizontal scalability data 354 may be the ability to connect multiple hardware or software entities so that they work as a single logical unit. The distribute function 356 may be a set of instructions that perform a specific task of allotting a data model to the database architecture 312. The static analysis module 358 may be a unit that performs analysis without actually executing programs. Static analysis may be performed on static code i.e., code that is not running during the analysis process, according to one embodiment.

FIG. 3 illustrates the database server 304 of the database selection system 102 may be connected to the workload data 302 and the output data 316 of the dynamic analysis algorithm 306. The abstraction table 324 may be coupled to the meta command 326 of the set of meta commands 340 present in the conceptual command domain 328. The set of meta commands 340 may be coupled to the first sub-domain 342 of the conceptual command domain 328 associated with the first database format data 318 and second sub-domain 344 associated with the second database format data 320. The developer 322 may interact with the logical schema 310. The logical schema 310 may be associated with the database architecture 312. The transitional freedom algorithm 346 may be coupled with the logical schema 310. The instance (e.g., instance data 314) of the database server 304 may be associated with the database architecture 312 and the output data 316 through the network 126. The service level data 350 may be coupled to the database architecture 312, according to one embodiment.

In circle '13', workload data 302 may be received from the database server 304 of the database selection system 102. In circle '14', the logical schema 310 is re-distributed (e.g., using re-distribute function 308) to a database architecture 312 over an instance (e.g., instance data 314) of the database server 304 based on the output (e.g., output data 316) of the dynamic analysis algorithm 306. In circle '15', database architecture 312 may comply in actions to the service level (e.g., service level data 350). In circle '16', logical schema 310 from the developer 322 consisting of the abstraction table 324 defined by the meta command 326 of the conceptual command domain 328 may be processed. In circle '17', the set of the meta commands 340 defining the abstraction table 324 may be analyzed to determine the first sub-domain 342 of the conceptual command domain 328 associated with the first database format data 318 and the second sub-domain 344 of the conceptual command domain 328 associated with the second database format data 320.

In circle '18', the transitional freedom algorithm 346 of a format may be constrained consisting of the logical schema 310 and/or the portion of the logical schema 348. In circle '19', the service level (e.g., service level data 350) including vertical scalability (e.g., vertical scalability data 352) and/or horizontal scalability (e.g., horizontal scalability data 354) associated with the user 103 may be determined. In circle '20', the logical schema 310 may be distributed (e.g., using distribute function 356) to the database architecture 312 over an instance (e.g., instance data 314) of the database server 304 based on the output of static analysis module 358, according to one embodiment.

FIG. 4 is an exploded view of dynamic analysis algorithm 306 of FIG. 3. Particularly, FIG. 4 illustrates a query complexity 402, a query frequency 404, a server workload 406, a processor intensiveness 408, a server intensiveness 410, a common query geography 412, a server down-time 414, a geographic proximity 416, a workload request 418 and a temporal query load pattern 420, according to one embodiment.

The query complexity 402 may be the complexity of a problem or an algorithm expressed in terms of the decision tree model. The query frequency 404 may include frequently occurring words or concepts in the sources. The server workload 406 may be the amount of work performed by the computer server 100 (of FIG. 1) in a given period of time. The processor intensiveness 408 may refer to the number of processor cycles consumed executing the queries. The server intensiveness 410 may refer to the number of processor cycles consumed executing the queries across a series of computing devices and/or logical computing devices forming a server. The common query geography 412 may be a geospatial region in which queries are more frequent based on an analysis of typical queries that might be expected across physical locations of a set of users utilizing the computer server 100. The server down-time 414 may refer to the periods when the system is unavailable. The geographic proximity 416 may be a measurement of how close and/or how far something is in relation to another geographic location when generating queries of the database selection system 102 (of FIG. 1).

The workload request 418 may be a set of instructions that may request different functions to be performed for executing a particular operation or series of operations. The temporal query load pattern 420 may govern a time based sequence that determines a correlation between inputs of queries into the database 124 through the database selection system 102 (of FIG. 1). FIG. 4 illustrates the dynamic analysis algorithm 306 may be applied to assess query complexity 402 and/or query frequency 404, measure server workload 406 for processor intensiveness 408 and/or server intensiveness 410, detect a common query geography 412, a server down-time 414, a geographic proximity 416 of a workload request 418 and/or a temporal query load pattern 420, according to one embodiment.

Figure 5:
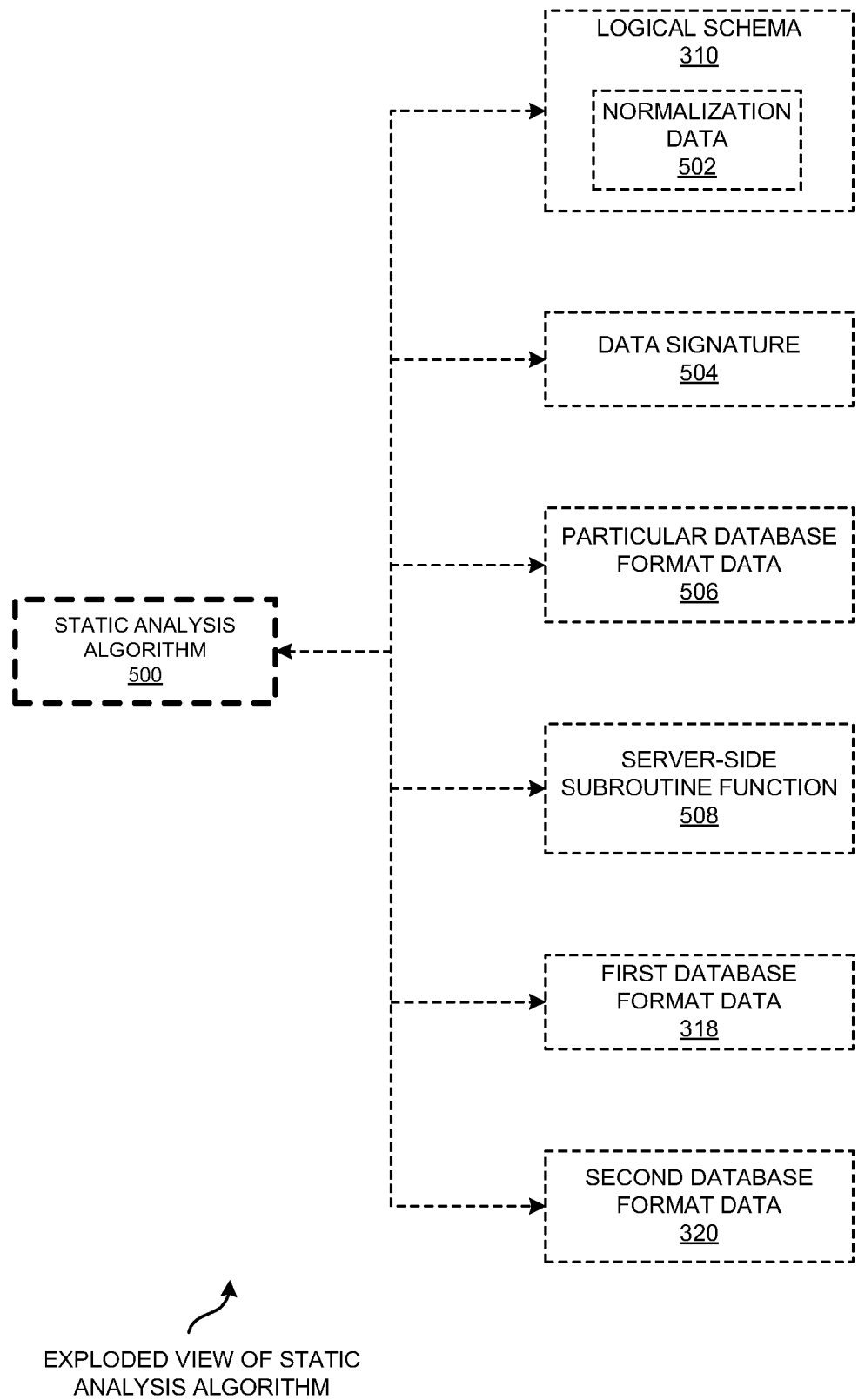
FIG. 5 is an exploded view of a static analysis algorithm, according to one embodiment.

FIG. 5 is an exploded view of static analysis algorithm 550. Particularly, the FIG. 5 illustrates normalization data 502, data signature 504, particular database format data 506, a server-side subroutine function 508. The normalization data 502 may include data obtained by dividing the database 124 into two or more tables and defining relationships between the tables. The data signature 504 may be a function that can take a row (from the set of rows 330) and generate some derivative integer for that row. If the two rows (from the set of rows 330) are similar they would generate very close integers, if the rows (from the set of rows 330) are different, they would generate distant integers. If there are identical rows (in the set of rows 330) (of the FIG. 3), then same data signature 504 may be generated. The particular database format data 506 may be the actual data that is specially organized for rapid search and retrieval by a computer. The server-side subroutine function 508 may be a set of instructions designed to perform a frequently used operation within a program by the computer server 100 (of FIG. 1) in a client-server relationship in the computer networking. FIG. 5 illustrates that the static analysis algorithm 550 may be applied to calculate an extent of normalization data 502 of the logical schema 310, detect a data signature 504 within the set of data values 334, detect a server-side subroutine (e.g., using server-side subroutine function 508) and/or operability in the first database format data 318 and the second database format data 320 (of FIG. 3), according to one embodiment.

Figure 6:
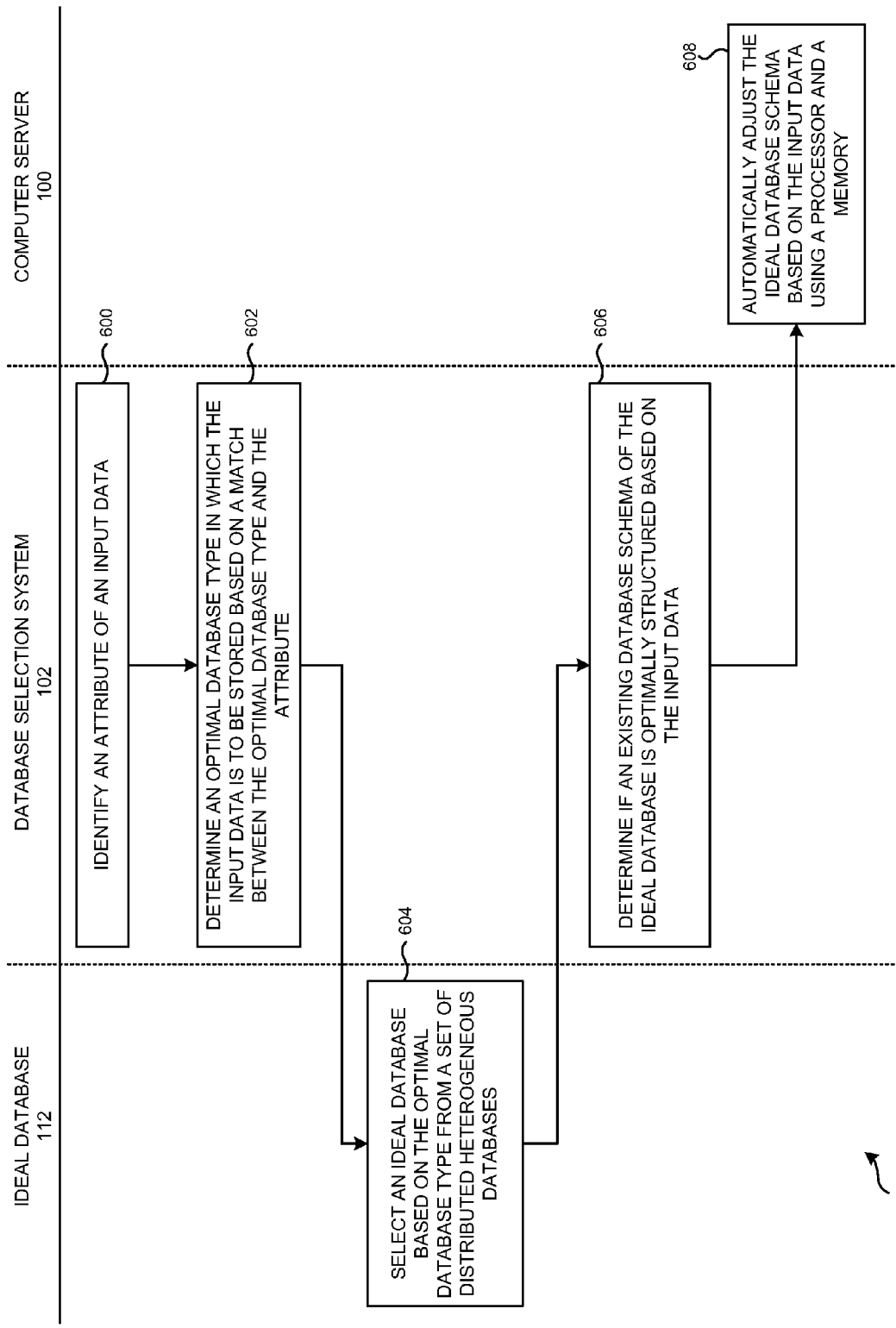
FIG. 6 is a critical path view illustrating the processes involved in adjusting an ideal database schema using computer server of FIG. 1, according to one embodiment.

FIG. 6 is a critical path view 650 of adjusting the ideal database schema 118, according to embodiment. In operation 600, database selection system 102 may identify an attribute (e.g., attribute data 104) of an input data 106. In operation 602, the database selection system 102 may determine an optimal database type (e.g., optimal database type data 108) in which the input data 106 is to be stored based on a match between the optimal database type (e.g., optimal database type data 108) and the attribute (e.g., attribute data 104). In operation 604, the ideal database 112 may be selected based on the optimal database type (e.g., optimal database type data 108) from a set of distributed heterogeneous databases 114. In operation 606, database selection system 102 may determine if an existing database schema 116 of the ideal database 112 is optimally structured based on the input data 106. In operation 608, the database selection system 102 may automatically adjust the ideal database schema 118 based on the input data 106 using a processor 120 and a memory 122 of the computer server 100 (of FIG. 1), according to one embodiment.

Figure 7:
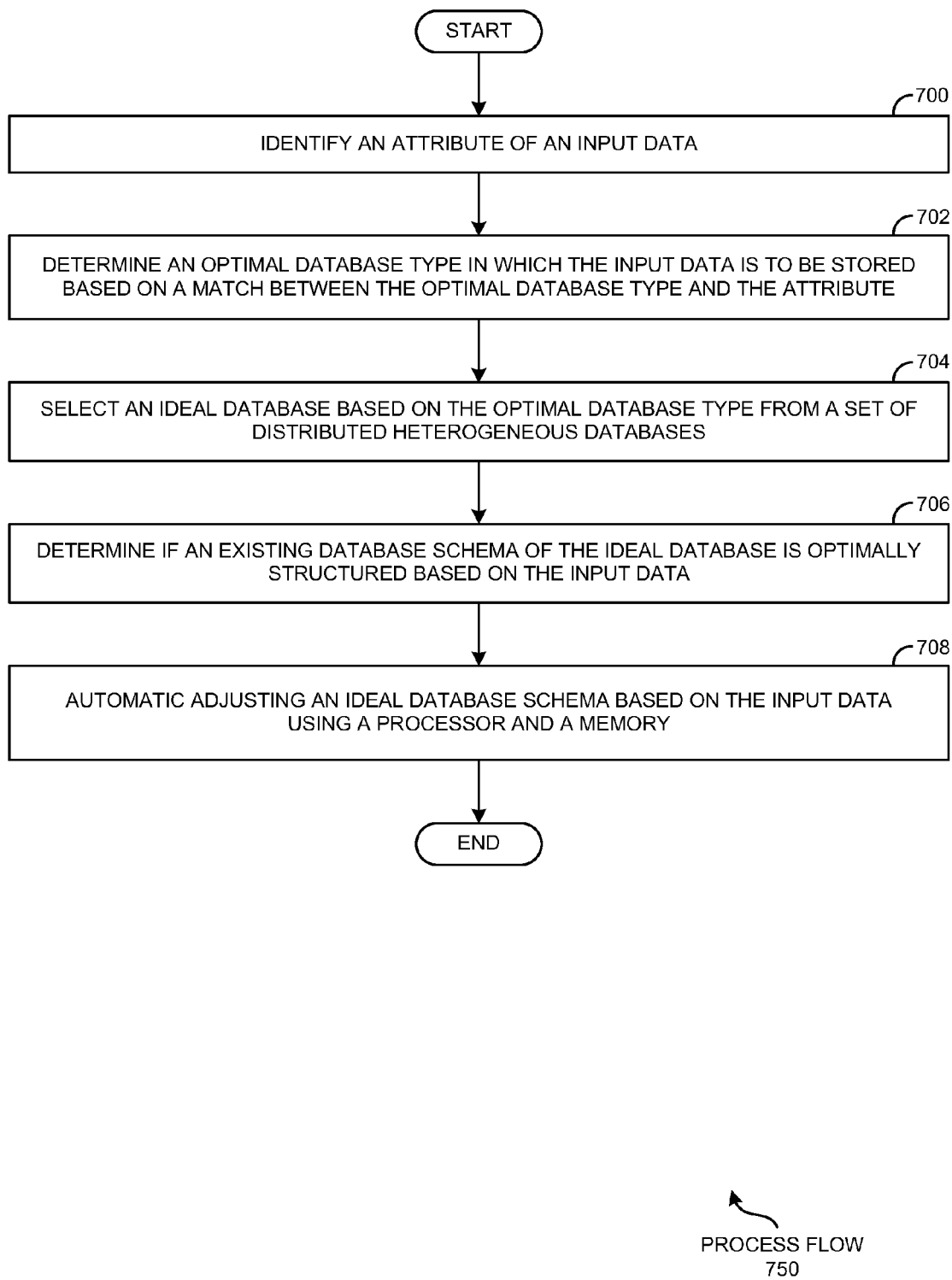
FIG. 7 is a process flow diagram of automatically adjusting an ideal database schema based on an input data, according to one embodiment.

FIG. 7 is a process flow 750 of selecting an ideal database 112 based on the optimal database type (e.g., optimal database type data 108) from a set of distributed heterogeneous databases 114, according to at least one embodiment. In operation 700, a database selection system 102 may identify an attribute (e.g., attribute data 104) of an input data 106. In operation 702, an optimal database type (e.g., optimal database type data 108) may be determined in which the input data 106 is to be stored based on a match between the optimal database type (e.g., optimal database type data 108) and the attribute (e.g., attribute data 104). In operation 704, the database selection system 102 may select the ideal database 112 based on the optimal database type (e.g., optimal database type data 108) from a set of distributed heterogeneous databases 114. In operation 706, the database selection system 102 may determine if an existing database schema 116 of the ideal database 112 is optimally structured based on the input data 106. In operation 708, the ideal database schema 118 may be automatically adjusted based on the input data 106 using a processor 120 and a memory 122 (of FIG. 1), according to one embodiment.

Figure 8:
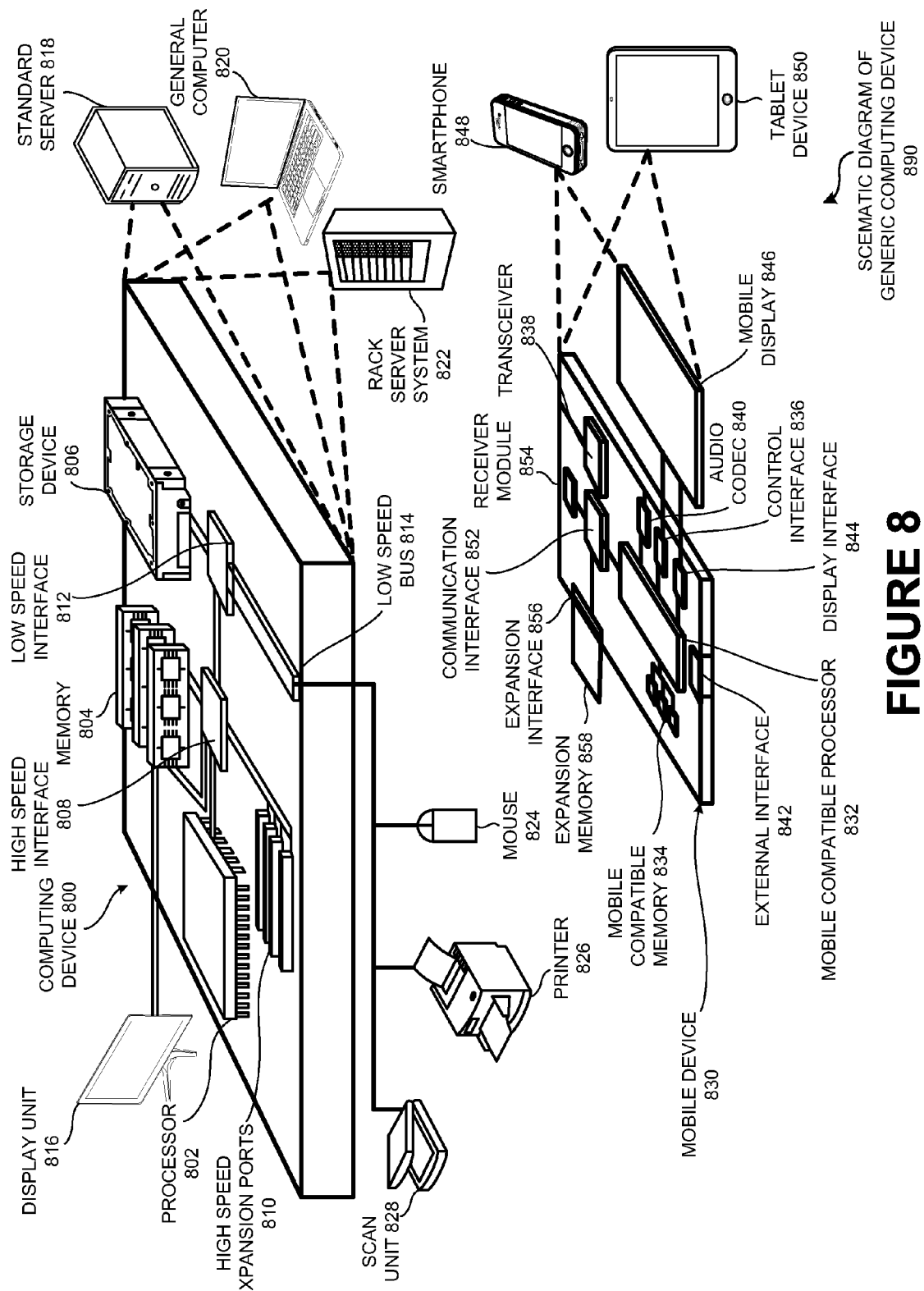
FIG. 8 is a schematic diagram of generic computing devices that can be used to implement the methods and systems disclosed herein, according to one or more embodiments.

FIG. 8 is a schematic diagram of generic computing device 890 that can be used to implement the methods and systems disclosed herein, according to one or more embodiments. The computing device 800 may represent various forms of digital computers, such as laptops, desktops, workstations, personal digital assistants, servers, blade servers, mainframes, and/or other appropriate computers. The mobile device 830 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The computing device 800 may include a processor 802, a memory 804, a storage device 806, a high-speed interface 808 coupled to the memory 804 and a plurality of high speed expansion ports 810, and a low speed interface 812 coupled to a low-speed bus 814 and a storage device 806. In one embodiment, each of the components heretofore may be intercoupled using various buses, and may be mounted on a common motherboard and/or in other manners as appropriate. The processor 802 may process instructions for execution in the computing device 800, including instructions stored in the memory 804 and/or on the storage device 806 to display a graphical information for a GUI on an external input/output device, such as a display unit 816 coupled to the high-speed interface 808. In other embodiments, multiple processors and/or multiple buses may be used, as appropriate, along with multiple memories and/or types of memory. Also, a plurality of computing devices may be coupled with, with each device providing portions of the necessary operations (e.g., as a server bank, a group of blade servers, and/or a multi-processor system).

The memory 804 may be coupled to the computing device 800. In one embodiment, the memory 804 may be a volatile memory. In another embodiment, the memory 804 may be a non-volatile memory. The memory 804 may also be another form of computer-readable medium, such as a magnetic and/or an optical disk. The storage device 806 may be capable of providing mass storage for the computing device 800. In one embodiment, the storage device 806 may include at least one of a floppy disk device, a hard disk device, an optical disk device, a tape device, a flash memory and/or other similar solid state memory device. In another embodiment, the storage device 806 may be an array of the devices in a computer-readable medium previously mentioned heretofore, computer-readable medium, such as, and/or an array of devices, including devices in a storage area network and/or other configurations.

A computer program may include instructions that, when executed, perform one or more methods, such as those described above. The instructions may be stored in at least one of the memory 804, the storage device 806, a memory coupled to the processor 802, and/or a propagated signal. The high-speed interface 808 may manage bandwidth-intensive operations for the computing device 800, while the low speed interface 812 may manage lower bandwidth-intensive operations. Such allocation of functions is exemplary only. In one embodiment, the high-speed interface 808 may be coupled to at least one of the memory 804, the display unit 816 (e.g., through a graphics processor and/or an accelerator), and to the plurality of high speed expansion ports 810, which may accept various expansion cards. In the embodiment, the low speed interface 812 may be coupled to at least one of the storage device 806 and the low-speed bus 814. The low-speed bus 814 may include a wired and/or wireless communication port (e.g., a Universal Serial Bus ("USB"), a Bluetooth® port, an Ethernet port, and/or a wireless Ethernet port). The low-speed bus 814 may also be coupled to at least one of scan unit 828, a printer 826, a mouse 824, and a networking device (e.g., a switch and/or a router) through a network adapter.

The computing device 800 may be implemented in a number of different forms, as shown in the figure. In one embodiment, the computing device 800 may be implemented as a standard server 818 and/or a group of such servers. In another embodiment, the computing device 800 may be implemented as part of a rack server system 822. In yet another embodiment, the computing device 800 may be implemented as a general computer 820 such as a laptop or desktop computer. Alternatively, a component from the computing device 800 may be combined with another component in a mobile device 830. In one or more embodiments, an entire system may be made up of a plurality of computing devices and/or a plurality of computing devices coupled to a plurality of mobile devices.

In one embodiment, the mobile device 830 may include at least one of a mobile compatible processor 832, a mobile compatible memory 834, and an input/output device such as a mobile display 846, a communication interface 852, and a transceiver 838, among other components. The mobile device 830 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 832 may execute instructions in the mobile device 830, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the mobile device 830, such as control of user interfaces, applications run by the mobile device 830, and wireless communication by the mobile device 830.

The mobile compatible processor 832 may communicate with a user through the control interface 836 and the display interface 844 coupled to a mobile display 846. In one embodiment, the mobile display 846 may be at least one of a Thin-Film-Transistor Liquid Crystal Display ("TFT LCD"), an Organic Light Emitting Diode ("OLED") display, and another appropriate display technology. The display interface 844 may include appropriate circuitry for driving the mobile display 846 to present graphical and other information to a user. The control interface 836 may receive commands from a user and convert them for submission to the mobile compatible processor 832. In addition, an external interface 842 may be provide in communication with the mobile compatible processor 832, so as to enable near area communication of the mobile device 830 with other devices. External interface 842 may provide, for example, for wired communication in some embodiments, or for wireless communication in other embodiments, and multiple interfaces may also be used.

The mobile compatible memory 834 may be coupled to the mobile device 830. The mobile compatible memory 834 may be implemented as at least one of a volatile memory and a non-volatile memory. The expansion memory 858 may also be coupled to the mobile device 830 through the expansion interface 856, which may include, for example, a Single In Line Memory Module ("SIMM") card interface. The expansion memory 858 may provide extra storage space for the mobile device 830, or may also store an application or other information for the mobile device 830. Specifically, the expansion memory 858 may include instructions to carry out the processes described above. The expansion memory 858 may also include secure information. For example, the expansion memory 858 may be provided as a security module for the mobile device 830, and may be programmed with instructions that permit secure use of the mobile device 830. In addition, a secure application may be provided on the SIMM card, along with additional information, such as placing identifying information on the SIMM card in a non-hackable manner.

The mobile compatible memory 834 may include at least one of a volatile memory (e.g., a flash memory) and a non-volatile memory (e.g., a non-volatile random-access memory ("NVRAM")). In one embodiment, a computer program includes a set of instructions that, when executed, perform one or more methods. The set of instructions may be stored on at least one of the mobile compatible memory 854, the expansion memory 858, a memory coupled to the mobile compatible processor 832, and a propagated signal that may be received, for example, over the transceiver 838 and/or the external interface 842.

The mobile device 830 may communicate wirelessly through the communication interface 852, which may include a digital signal processing circuitry. The communication interface 852 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver. In addition, short-range communication may occur, such as using a Bluetooth®, Wi-Fi, and/or other such transceiver 838. In addition, a GPS ("Global Positioning System") receiver module may provide additional navigation-related and location-related wireless data to the mobile device 830, which may be used as appropriate by a software application running on the mobile device 830.

The mobile device 830 may also communicate audibly using an audio codec 840, which may receive spoken information from a user and convert it to usable digital information. The audio codec 840 may likewise generate audible sound for a user, such as through a speaker (e.g., in a handset of the mobile device 830). Such a sound may include a sound from a voice telephone call, a recorded sound (e.g., a voice message, a music files, etc.) and may also include a sound generated by an application operating on the mobile device 830.

The mobile device 830 may be implemented in a number of different forms, as shown in the figure. In one embodiment, the mobile device 830 may be implemented as a smartphone 848. In another embodiment, the mobile device 830 may be implemented as a personal digital assistant ("PDA"). In yet another embodiment, the mobile device, 830 may be implemented as a tablet device 850.

An example embodiment will now be described. John may use a database (e.g., SQL, MySQL, MongoDB) to organize and collect data. John's preferred database may be organized to model aspects of reality in a way that supports processes requiring this information in John's business such as during peak Christmas season demand. For example, John's employer Fun Toys, Inc. may use the database to model of toys in the Seattle warehouse in a way that supports finding a particular toy item in a particular category.

John may use a database management system (e.g., Microsoft, MSDE) to capture and analyze data. For example, John's preferred database management system may be a software system designed to allow the definition, creation, querying, update, and/or administration of databases. Thankfully, John's database may be portable across different database management systems as described in FIGS. 1-8 herein.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) include machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a mouse by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that includes at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include at least one of a local area network ("LAN") and a wide area network ("WAN") (e.g., the Internet). The computing system can include at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The process flows and flow diagrams depicted in the figures do not require the particular order shown, or sequential order, to achieve desirable results. In addition, others may be provided, or steps may be eliminated from the described flows, and other components may be added to or removed from the depictions.

The invention claimed is:

1. A computer memory having instructions executed by a processor to perform a method of a database selection system, the method comprising:
   identifying an attribute of an input data;
   determining an optimal database type in which the input data is to be stored based on a match between the optimal database type and the attribute;
   selecting an ideal database based on the optimal database type from a set of distributed heterogeneous databases;

determining if an existing database schema of the ideal database is optimally structured based on the input data;
automatically adjusting an ideal database schema based on the input data using the processor and the memory;
determining a storage requirement based on the input data;
automatically partitioning an elastic storage system based on the storage requirement;
associating a partitioned elastic storage system with the ideal database; and
dynamically scaling a storage size of the elastic storage system based on an additional input data.

2. The computer memory of claim 1, wherein the method further comprises:
wherein the ideal database is any one of a non-relational database, an unstructured database, and a relational database,
wherein a uniform query language is applied that initially defines a data structure in a relational manner, and wherein the data structure is optionally checked by the database selection system,
wherein the database selection system is part of a database management system, and
wherein the uniform query language is an omnibase query language.

3. The computer memory of claim 1, wherein the method further comprises:
wherein the ideal database is a non-relational database that permits a database to store and access unstructured data in a manner that optimizes a set of key-value stores to improve performance of the database in an absence of table relationships.

4. The computer memory of claim 1, wherein the method further comprises:
receiving a workload data from a database server of the database selection system;
applying a dynamic analysis algorithm to at least one:
assess a query complexity,
assess a query frequency,
measure a server workload for a processor intensiveness and a server intensiveness,
detect a common query geography,
a server down-time,
a geographic proximity of a workload request, and
detect a temporal query load pattern; and
re-distributing a logical schema to a database architecture over at least one instance of the database server based on an output of the dynamic analysis algorithm, the database architecture conforming to a service level and the database architecture comprising at least one of a first database format and a second database format.

5. The computer memory of claim 4 further comprising:
processing the logical schema from a developer comprised of an abstraction table defined by a meta command of a conceptual command domain,
wherein the abstraction table comprising a set of rows comprising records and a set of columns comprising attributes, the abstraction table having a set of data values at a set of fields occurring at a set of intersections of each row and each column;
analyzing a set of the meta commands defining the abstraction table to determine a first sub-domain of the conceptual command domain associated with the first database format and a second sub-domain of the conceptual command domain associated with the second database format;
constraining a transitional freedom of a format in which at least one of the logical schema and a portion of the logical schema may be expressed, the transitional freedom constrained to the first database format and the second database format; and
applying a static analysis algorithm to:
measure an extent of normalization of the logical schema, detect within the set of data values a data signature indicative of efficiency within a particular database format, and detect a server-side subroutine indicative of at least one of efficiency and operability in the first database format and the second database format.

6. The computer memory of claim 5 further comprising:
determining the service level associated with a user comprising at least one of a vertical scalability and a horizontal scalability; and
distributing the logical schema to the database architecture over one or more instances of the database server based on the output of a static analysis module, the database architecture conforming to the service level and the database architecture comprising at least one of the first database format and the second database format.

7. A method of a database selection system, comprising:
identifying an attribute of an input data;
determining an optimal database type in which the input data is to be stored based on a match between the optimal database type and the attribute;
selecting an ideal database based on the optimal database type from a set of distributed heterogeneous databases;
determining if an existing database schema of the ideal database is optimally structured based on the input data;
automatically adjusting an ideal database schema based on the input data using a processor and a memory;
determining a storage requirement based on the input data;
automatically partitioning an elastic storage system based on the storage requirement;
associating a partitioned elastic storage system with the ideal database; and
dynamically scaling a storage size of the elastic storage system based on an additional input data.

8. The method of claim 7:
wherein the ideal database is any one of a non-relational database, an unstructured database, and a relational database,
wherein a uniform query language is applied that initially defines a data structure in a relational manner, and wherein the data structure is optionally checked by the database selection system,
wherein the database selection system is part of a database management system, and
wherein the uniform query language is an omnibase query language.

9. The method of claim 8:
wherein the ideal database is the non-relational database that permits a database to store and access unstructured data in a manner that optimizes a set of key-value stores to improve performance of the database in an absence of table relationships.

10. The method of claim 8 further comprising:
receiving a workload data from a database server of the database selection system;
applying a dynamic analysis algorithm to at least one:
assess a query complexity,
assess a query frequency,
measure a server workload for a processor intensiveness and a server intensiveness,
detect a common query geography,
a server down-time,
a geographic proximity of a workload request, and detect a temporal query load pattern; and re-distributing a logical schema to a database architecture over at least one instance of the database server based on an output of the dynamic analysis algorithm, the database architecture conforming to a service level and the database architecture comprising at least one of a first database format and a second database format.

11. The method of claim 10 further comprising:

processing the logical schema from a developer comprised of an abstraction table defined by a meta command of a conceptual command domain, wherein the abstraction table comprising a set of rows comprising records and a set of columns comprising attributes, the abstraction table having a set of data values at a set of fields occurring at a set of intersections of each row and each column;

analyzing a set of the meta commands defining the abstraction table to determine a first sub-domain of the conceptual command domain associated with the first database format and a second sub-domain of the conceptual command domain associated with the second database format;

constraining a transitional freedom of a format in which at least one of the logical schema and a portion of the logical schema may be expressed, the transitional freedom constrained to the first database format and the second database format; and applying a static analysis algorithm to:

measure an extent of normalization of the logical schema, detect within the set of data values a data signature indicative of efficiency within a particular database format, and detect a server-side subroutine indicative of at least one of efficiency and operability in the first database format and the second database format.

12. The method of claim 11 further comprising:

determining the service level associated with a user comprising at least one of a vertical scalability and a horizontal scalability; and distributing the logical schema to the database architecture over one or more instances of a server based on the output of a static analysis module, the database architecture conforming to the service level and the database architecture comprising at least one of the first database format and the second database format.

13. A system of a database selection system comprising:

a computer server of a machine learning environment:

the computer server including one or more computers having instructions stored thereon that when executed cause the one or more computers:

to identify an attribute of an input data, to determine an optimal database type in which the input data is to be stored based on a match between the optimal database type and the attribute, to select an ideal database based on the optimal database type from a set of distributed heterogeneous databases, to determine if an existing database schema of the ideal database is optimally structured based on the input data, to automatically adjust the ideal database schema based on the input data using a processor and a memory, to determine a storage requirement based on the input data, to automatically partition an elastic storage system based on the storage requirement, to associate a partitioned elastic storage system with the ideal database, and to dynamically scale a storage size of the elastic storage system based on an additional input data.

14. The system of claim 13 wherein the computer server including one or more computers having instructions stored thereon that when executed cause the one or more computers to further:

wherein the ideal database is any one of a non-relational database, an unstructured database, and a relational database, wherein a uniform query language is applied that initially defines a data structure in a relational manner, and wherein the data structure is optionally checked by the database selection system, wherein the database selection system is part of a database management system, and wherein the uniform query language is an omnibase query language.

15. The system of claim 13:

wherein the ideal database is a non-relational database that permits a database to store and access unstructured data in a manner that optimizes a set of key-value stores to improve performance of the database in an absence of table relationships.

16. The system of claim 13 wherein the computer server including one or more computers having instructions stored thereon that when executed cause the one or more computers to further:

receive a workload data from a database server of the database selection system, apply a dynamic analysis algorithm to at least one:

assess a query complexity, assess a query frequency, measure a server workload for a processor intensiveness and a server intensiveness, detect a common query geography, a server down-time, a geographic proximity of a workload request, and detect a temporal query load pattern; and re-distribute a logical schema to a database architecture over at least one instance of the database server based on an output of the dynamic analysis algorithm, the database architecture conforming to a service level and the database architecture comprising at least one of a first database format and a second database format.

17. The system of claim 16 wherein the computer server including one or more computers having instructions stored thereon that when executed cause the one or more computers to further:

process the logical schema from a developer comprised of an abstraction table defined by a meta command of a conceptual command domain, wherein the abstraction table comprising a set of rows comprising records and a set of columns comprising attributes, the abstraction table having a set of data values at a set of fields occurring at a set of intersections of each row and each column, analyze a set of the meta commands defining the abstraction table to determine a first sub-domain of the conceptual command domain associated with a first database format and a second sub-domain of the conceptual command domain associated with the second database format, constrain the transitional freedom of a format in which at least one of the logical schema and a portion of the logical schema may be expressed, the transitional freedom constrained to the first database format and the second database format, and apply a static analysis algorithm to:

measure an extent of normalization of the logical schema, detect within the set of data values a data signature indicative of efficiency within a particular database format, and detect a server-side subroutine indicative of at least one of efficiency and operability in the first database format and the second database format.

18. The system of claim 17 wherein the computer server including one or more computers having instructions stored thereon that when executed cause the one or more computers to further:

determine the service level associated with a user comprising at least one of a vertical scalability and a horizontal scalability, and distribute the logical schema to the database architecture over one or more instances of a server based on the output of a static analysis module, the database architecture conforming to the service level and the database architecture comprising at least one of the first database format and the second database format.

* * * * *